United States Patent [19]
Parisi et al.

[11] 4,204,186
[45] May 20, 1980

[54] TEMPERATURE PROBE

[75] Inventors: Michael S. Parisi; John A. Pauly, both of Milford, Mass.

[73] Assignee: Walter Kidde & Company, Inc., Clifton, N.J.

[21] Appl. No.: 934,031

[22] Filed: Aug. 16, 1978

[51] Int. Cl.² .......................... H01C 7/02; H01C 7/04
[52] U.S. Cl. ........................................ 338/30; 29/612; 338/28
[58] Field of Search ............... 338/28, 30, 25, 229; 219/10.55 E, 10.55 D, 10.55 R; 73/352, 398 AR; 29/612

[56] References Cited
U.S. PATENT DOCUMENTS

| | | | |
|---|---|---|---|
| 3,815,113 | 6/1974 | Welch | 338/28 X |
| 3,974,696 | 8/1976 | Fitzmayer | 219/10.55 E X |
| 3,975,720 | 8/1976 | Chen et al. | 219/10.55 E |
| 4,122,322 | 10/1978 | Ohkubo et al. | 219/10.55 E X |

*Primary Examiner*—C. L. Albritton
*Attorney, Agent, or Firm*—John E. Toupal

[57] ABSTRACT

The invention is a temperature probe including an elongated electrically conductive housing having one closed end and one open end. Electrically connected to the inner surface of the closed end is one lead of a thermistor, the second lead of which is connected to the inner conductor of a coaxial cable extending into the open end of the housing. The outer conductor of the cable is electrically connected to the housing near its open end in such a manner as to compress the cable within the housing and induce longitudinal deformation thereof. The compression of the cable within the housing insures that the first thermistor lead is in intimate contact with the closed end of the housing when an electrical connection is made therebetween, preferably by a heliarc welding operation.

9 Claims, 2 Drawing Figures

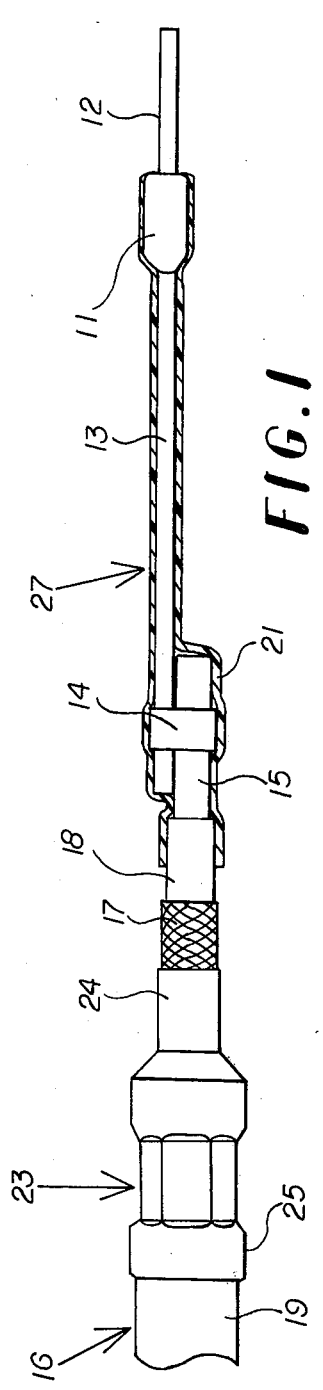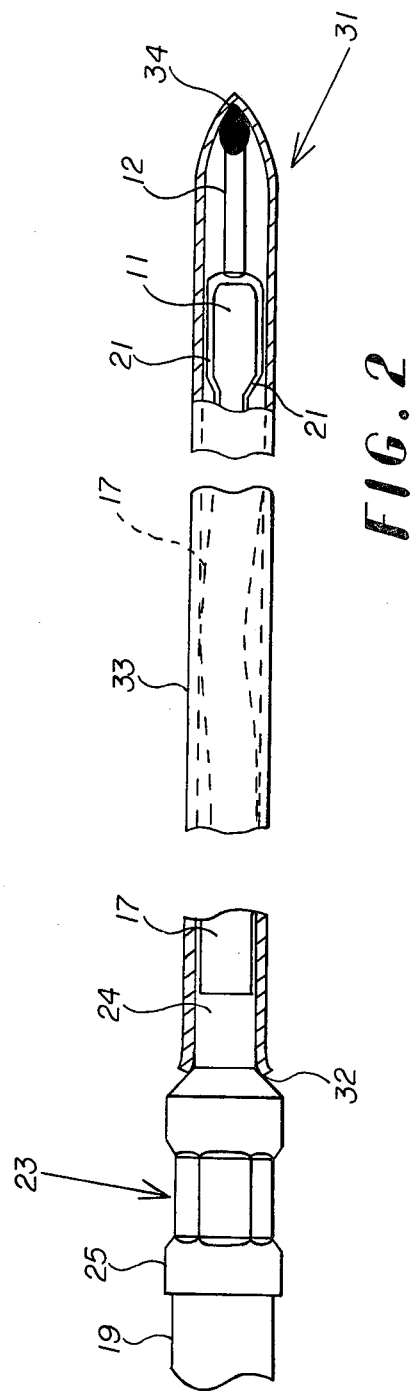

TEMPERATURE PROBE

BACKGROUND OF THE INVENTION

This invention relates generally to a temperature probe, and more particularly, to a temperature responsive thermistor probe for use with microwave ovens.

Many microwave ovens are now equipped with temperature probes that are used to control various oven functions. The probes are inserted into food being prepared and produce temperature indicating electrical output signals that are used to reduce or eliminate heating cycles, eliminate microwave cooking cycles, initiate radiant heating cycles, etc. Typically, the temperature sensor employed with such probes is a suitable thermistor having a resistance that varies with temperature. Effective use of these probes requires that the temperature sensor be near the end of the probe so as to facilitate its location near the center of the food being tested. For this reason, prior oven probes constituted a hollow metallic tip into which a thermistor is welded. The tip is then attached to an elongated open-ended metallic housing that encloses a coaxial cable electrically connected to the thermistor. However, because of stringent requirements for liquid tight seals and microwave shielding, the attachment of the thermistor retaining tip to the elongated housing has been a costly and troublesome operation.

The object of this invention, therefore, is to provide an improved temperature probe that eliminates problems formally associated with the attachment of thermistor retaining tips to elongated probe housings.

SUMMARY OF THE INVENTION

The invention is a temperature probe including an elongated electrically conductive housing having one closed end and one open end. Electrically connected to the inner surface of the closed end is one lead of a thermistor, the second lead of which is connected to the inner conductor of a coaxial cable extending into the open end of the housing. The outer conductor of the cable is electrically connected to the housing near its open end in such a manner as to compress the cable within the housing and induce longitudinal deformation thereof. The compression of the cable within the housing insures that the first thermistor lead is in intimate contact with the closed end of the housing when an electrical connection is made therebetween, preferably by a heliarc welding operation. By fabricating a temperature probe out of a unitary elongated probe housing, the problems normally associated with the attachment of a probe tip to a probe housing are eliminated.

In a preferred embodiment of the invention, the connection between the outer conductor of the cable and the housing is made with a ferrule, an internal surface portion of which is secured to the outer conductor and an outer portion of which is pressed into the open end of the housing. An additional inner surface portion of the ferrule is secured to an insulative sheath on the cable so as to provide the probe with mechanical strain relief.

A feature of the invention is a method for constructing a temperature probe as described above. The method includes the steps of providing a length of coaxial cable having an inner conductor, an outer conductor insulated from the inner conductor and an insulative sheath covering the outer conductor, stripping a portion of the insulative sheath and outer conductor to expose a portion of the inner conductor; providing a thermistor having first and second leads; electrically connecting the second lead to the portion of the inner conductor; stripping an additional portion of the insulative sheath to expose a length portion of the outer conductor; forming an elongated unitary housing of electrically conductive material and having a closed end and an open end; inserting the thermistor and said length portion of the outer conductor into the open end of the housing so as to bring the first lead of the thermistor into contact with the inner surface of the closed end of the housing; compressing the coaxial cable into the housing so as to produce longitudinal deformation of the length portion of the outer conductor; electrically connecting the outer conductor length portion to the housing; securing said open end of the housing to the coaxial cable so as to maintain the compression and deformation thereof; and welding said first lead of the thermistor to the inner surface of the closed end of the housing.

DESCRIPTION OF THE DRAWINGS

These and other objects and features of the invention will become more apparent upon a perusal of the following description taken in conjunction with the accompanying drawings wherein:

FIG. 1 is a schematic view of a temperature probe of the present invention at one stage of its construction; and FIG. 2 is a schematic view of the completed probe with certain sections shown partially in cross-section to illustrate construction details.

DESCRIPTION OF THE PREFERRED EMBODIMENT

Referring now to FIG. 1 there is shown a suitable transistor 11, such as a disc diode thermistor, having a first lead 12 and an oppositely directed second lead 13. Electrically connected to the second lead 13 by a crimp tab 14 is an inner conductor 15 of a coaxial cable 16. Also included in the cable 16 is a woven annular outer conductor 17 electrically isolated from the inner conductor 15 by an insulative cover 18. Another insulative sheath 19 covers and electrically isolates the outer conductor 17.

As illustrated in FIG. 1, portions of the insulator cover 18, the outer conductor 17, and the insulative sheath 19 are stripped away to expose a length of the inner conductor 15. In addition, another length of the inner sheath 19 is stripped away to expose a length portion 22 of the outer conductor 17. An insulative tube 21 made, for example, of Mylar, is shrunk over the thermistor 11, the second lead 13 and the exposed inner conductor 15 so as to provide electrical isolation thereof. Also illustrated in FIG. 1 is an electrically conductive ferrule 23 having a first length portion 24 secured, for example, by crimping, to an end of the outer conductor length portion 22 so as to be in electrical contact therewith. An additional length portion 25 of the ferrule 23, of larger diameter than the portion 23, if mechanically secured to the insulative sheath 19 also, for example, by crimping.

Referring now to FIG. 2 there is shown a completed probe 31. After completion, the assembly 27 illustrated in FIG. 1 is inserted into the open end 32 of an elongated unitary housing 33 having a closed end 34. Upon insertion of the assembly 27, the first lead 12 of the thermistor 11 is in contact with the inner surface of the closed end 34 of the housing 33 and the smaller diameter ferrule 23 length portion 24 is press-fitted into the open end 32 creating an electrical contact between the ferrule 23 and the housing 33. However, the total length of the assembly 27 between the larger diameter ferrule portion 25 and the free end of the first thermistor lead 12 is greater than the total length of the housing 33. Therefore, insertion of the assembly 27 to the housing 33 results in compression of and longitudinal deformation of the cable 16 as shown by dotted lines in the middle section of FIG. 2. This compression insures intimate engagement between the thermistor lead 12 and the inner surface 34 of the closed end 34 during permanent connection thereof by a heliarc welding operation. After completion of the weld, the tip end 34 is ground into a point as illustrated in FIG. 2.

During typical use of the probe 31, the free end of the cable 16 is connected to a control unit for a conventional microwave oven. The probe 31 can then be inserted so as to monitor the cooking temperature of food being prepared in an oven (not shown). Current flow from the unit 31 flows through the inner conductor 15, the thermistor lead 13, the thermistor 11, the thermistor lead 12, the housing 33, and returns through the outer conductor 17. Temperature changes in the food being monitored induce corresponding changes in the temperature of the thermistor 11 and thereby in its resistance. Accordingly, the level of current flowing through the probe 31 provides an indication of the food temperature being monitored.

Obviously, many modifications and variations of the present invention are possible in light of the above teachings. It is therefore to be understood that within the scope of the appended claims, the invention can be practised otherwise than as specifically described.

What is claimed is:

1. A temperature probe assembly comprising:
   an elongated electrically conductive unitary housing defining a housing cavity and having a closed end and an open end;
   a thermistor positioned within said housing cavity adjacent to said closed end and having first and second leads, said first lead being electrically connected to the interior surface of said closed end;
   a resilient coaxial cable having an inner conductor connected to said second lead of said thermistor and an outer conductor insulated from said inner conductor and connected to said electrically conductive housing, said coaxial cable extending into said open end of said housing and being of greater length than said housing so as to be compressed into said housing cavity and longitudinally deformed thereby, said deformed cable exerting a force on said thermistor that maintains said first lead against said closed end; and
   a coupling means securing said housing to said coaxial cable so as to prevent relative longitudinal movement therebetween.

2. An assembly according to claim 1 wherein said coupling means comprises a ferrule having an inner surface portion secured to said outer conductor and an outer surface portion projecting into said open end of said housing and electrically connected therewith.

3. An assembly according to claim 2 wherein said coaxial cable further comprises an insulative sheath partially covering said outer conductor, and said ferrule further comprises a second inner surface portion secured to said insulative sheath.

4. An assembly according to claim 3 wherein one end of said ferrule is crimped over said outer conductor and pressed into said open end of said housing, and the opposite end of said ferrule is crimped over said insulative sheath.

5. An assembly according to claim 4 wherein said first lead of said thermistor is heliarc welded to said interior surface of said closed end of said housing.

6. A method for constructing a temperature probe and including the steps of:
   providing a length of coaxial cable having an inner conductor, an outer conductor insulated from said inner conductor and an insulative sheath covering said outer conductor;
   stripping a portion of said insulative sheath and outer conductor to expose a portion of said inner conductor;
   providing a thermistor having first and second leads;
   electrically connecting said second lead to said portion of said inner conductor;
   stripping an additional portion of said insulative sheath to expose a length portion of said outer conductor;
   forming an elongated unitary housing of electrically conductive material and having a closed end and an open end said housing having a length less than said length of cable;
   inserting said thermistor and said length portion of said outer conductor into said open end of said housing so as to force said first lead of said thermistor into contact with the inner surface of said closed end of said housing;
   compressing said coaxial cable into said housing so as to produce longitudinal deformation of said length portion of said outer conductor and thereby produce a force on said thermistor that maintains said first lead against said closed end of said housing;
   electrically connecting said outer conductor length portion to said housing;
   securing said open end of said housing to said coaxial cable so as to maintain said compression and deformation thereof; and
   welding said first lead of said thermistor to said inner surface of said closed end of said housing.

7. A method according to claim 6 wherein said steps of electrically connecting said outer conductor length portion to said housing and securing said open end of said housing to said coaxial cable comprise securing an inner surface portion of a ferrule to said outer conductor length portion and pressing an outer surface portion of said ferrule into said open end of said housing.

8. A method according to claim 7 including the step of securing an additional inner surface portion of said ferrule to said insulative sheath of said coaxial cable.

9. A method according to claim 8 wherein said welding step comprises heliarc welding said first lead of said thermistor to said inner surface of said closed end of said housing.

* * * * *